United States Patent [19]

Cox

[11] Patent Number: 5,340,969
[45] Date of Patent: Aug. 23, 1994

[54] METHOD AND APPARATUS FOR APPROVING TRANSACTION CARD BASED TRANSACTIONS

[75] Inventor: Tim W. Cox, Austin, Tex.

[73] Assignee: Dresser Industries, Inc., Dallas, Tex.

[21] Appl. No.: 771,261

[22] Filed: Oct. 1, 1991

[51] Int. Cl.[5] .................... G07F 7/08; G06F 15/24
[52] U.S. Cl. .................... 235/381; 235/380; 235/382; 340/825.34; 340/825.35; 222/23
[58] Field of Search .................... 235/381, 380, 382; 340/825.35, 825.34; 222/16, 23, 22, 26, 32

[56] References Cited

U.S. PATENT DOCUMENTS

| | | | |
|---|---|---|---|
| 3,434,130 | 3/1969 | Lemelson . | |
| 3,609,690 | 9/1971 | Nissman et al. | 340/149 |
| 3,612,687 | 10/1971 | Cook et al. . | |
| 3,696,335 | 10/1972 | Lemelson | 340/149 A |
| 3,798,602 | 3/1974 | Hynes, Jr. | 340/149 A |
| 3,927,800 | 12/1975 | Zinsmeyer et al. | 222/26 |
| 4,067,486 | 1/1978 | Hyde et al. | 222/26 |
| 4,186,871 | 2/1980 | Anderson et al. | 235/380 |
| 4,290,538 | 9/1981 | White et al. | 222/32 |
| 4,395,626 | 7/1983 | Barker et al. | 235/381 |
| 4,395,627 | 7/1983 | Barker et al. | 235/381 |
| 4,472,626 | 9/1984 | Frid | 235/380 |
| 4,558,211 | 12/1985 | Berstein | 235/380 |
| 4,594,663 | 6/1986 | Nagata et al. | 364/401 |
| 4,675,515 | 6/1987 | Lucero | 235/381 |
| 4,679,236 | 7/1987 | Davies | 235/380 |
| 4,700,294 | 10/1987 | Haynes | 364/200 |
| 4,822,985 | 4/1989 | Boggan et al. | 235/380 |
| 4,900,906 | 2/1990 | Pusic | 235/381 |
| 4,930,665 | 6/1990 | Devine | 222/28 |
| 4,934,565 | 6/1990 | Heisey et al. | 222/22 |
| 4,941,090 | 7/1990 | McCarthy | 364/405 |
| 4,943,707 | 7/1990 | Boggan | 235/380 |
| 4,945,214 | 7/1990 | Hancock et al. | 235/436 |
| 4,947,027 | 8/1990 | Golightly | 235/380 |
| 4,953,085 | 8/1990 | Atkins | 364/408 |
| 4,963,723 | 10/1990 | Masada | 235/384 |
| 4,967,366 | 10/1990 | Kaehler | 235/381 |

*Primary Examiner*—Paul M. Dzierzynski
*Assistant Examiner*—Drew A. Dunn
*Attorney, Agent, or Firm*—Arnold, White & Durkee

[57] ABSTRACT

A method and apparatus for approving or disapproving transactions, particularly fuel dispensing transactions, based upon transaction cards. The invention converts actual invalid transaction card account data into incremental transaction card account data which is representative of the difference between successive entries in the actual invalid transaction card account data. The incremental invalid transaction card account data is downloaded from a central location, and stored at individual fuel vendor locations, thereby minimizing the requirement to communicate with the central location while minimizing memory requirements at the fuel vendor locations. In operation, when a transaction card, for example, a credit or debit card, is presented for a transaction, the incremental invalid transaction card data is resolved into actual invalid transaction card data, and the account number of the presented transaction card is compared with the resolved actual invalid transaction card account data. The dispensing of fuel is either approved or disapproved based upon the comparison.

5 Claims, 3 Drawing Sheets

METHOD AND APPARATUS FOR APPROVING TRANSACTION CARD BASED TRANSACTIONS

BACKGROUND OF THE INVENTION

The present invention relates to a method and apparatus for approving financial transactions, particularly self service fuel purchases, by identifying valid or invalid transaction cards.

Transaction cards, such as credit cards or debit cards, have enjoyed increasing use in recent history. This increased use has resulted in increased financial losses due to transaction card fraud. A primary source of such losses is the use of invalid transaction cards, which are defined herein as transaction cards that have been reported lost or stolen, cards that have been used in excess of a predetermined credit or debit limit, and cards that have been otherwise deactivated.

One known method of minimizing the losses resulting from the uses of invalid transaction cards is the distribution of a printed list of invalid cards, such as the so-called Card Recovery Bulletin, which is then used by vendors to check the account number of a card presented for a transaction against the invalid card list. A primary drawback of using such a printed list is the time lag between the determination that a transaction card is invalid, and the distribution of that invalid card information to vendors.

This time lag has been addressed by use of real-time on-line communications networks which allow vendors to report the account number of a card presented for a transaction to a central location by telephone or similar communications network. The account number under investigation is then compared to a centralized list of invalid card numbers, which is updated much more rapidly than the prior printed lists. However, such real-time on-line comparisons are at the mercy of the particular communications network being used, and such comparisons become impossible when the communications link is inoperative. In addition, even when operative, such a centralized master list of invalid cards must be accessed by hundreds or even thousands of vendors, which can result in unacceptable access delays. Minimizing such delays is particularly important in self service transactions, such as self service gasoline purchases.

This has given rise to the decentralization of the master lists for invalid transaction cards, with the transaction card validity assessment being performed at the vendor site with the invalid card information being periodically updated from a central location.

One such system is disclosed in U.S. Pat. No. 3,696,335, issued Oct. 3, 1972, which contemplates the storage of the entire invalid card list in each transaction terminal at a vendor site. However, this system has proven impractical because the lists of invalid transaction cards have become so large that distribution of the entirety of such lists to each transaction terminal is virtually impossible.

One approach to this problem is presented in U.S. Pat. No. 4,558,211, issued Dec. 10, 1985, which proposes the addition of an identifier to each listed invalid card which indicates the geographical location in which the invalid card is most likely to be used. Then, subsets of the invalid card list are transmitted in their entirety to vendors in a particular geographical location.

While this system greatly reduces the amount of invalid transaction card information that is transmitted from the central location to the individual vendors, such a system is ineffective to detect use of invalid cards in geographical locations other than those indicated by the selected identifier.

Yet another system for reducing the amount of invalid card data to be transmitted to individual vendors is disclosed in U.S. Pat. No. 4,943,707, issued Jul. 24, 1990. In this system, the entire invalid card list is compressed before transmitting to the individual vendors. The compression is accomplished by application of so-called "hashing" procedures to create bit maps which approximate the invalid card data, which are then distributed to transaction terminals.

However, this system contemplates a reduction of the amount of invalid card data that is downloaded by a factor of only about five, and also contemplates the erroneous identification of a valid transaction card as invalid in as much as ten percent of all transactions.

It would therefore be desirable to provide a transaction card validation system and method which would permit accurate determination of transaction card validity, while at the same time reducing the amount of invalid transaction card data that must be downloaded from a central location and stored at vendor sites in transaction terminals.

SUMMARY OF THE INVENTION

The present invention solves the above-noted drawbacks of the prior art by providing a method and apparatus for approving or disapproving financial transactions based upon the use of transaction cards. The invention greatly reduces the amount of transaction card account information that must be downloaded from a central location to individual vendor sites, without sacrificing accuracy, and without introducing the possibility of incorrectly concluding that an invalid transaction card is valid, or vice versa.

In general, the present invention stores transaction card account information in the form of incremental data, i.e., data representative of the increment between successive actual transaction card accounts. Then, when a transaction card is presented for a transaction, the incremental data is resolved into actual transaction card account data, and the transaction card account under consideration is compared with the actual transaction card account data to approve or disapprove of the transaction.

The present invention also contemplates compressing actual transaction card account data into incremental transaction card account data by calculating differences between successive entries in the actual transaction card account data file, and storing the differences in an incremental transaction card account file. Such processing results in as much as a 20:1 data compression, without any loss of data.

A particular embodiment in the present invention is a self service fuel dispensing apparatus and method which reads account numbers from transaction cards presented by self service customers, and which compares the presented transaction card account numbers with actual transaction card account numbers which have been resolved from an incremental transaction card account file stored at the self service site. If, as a result of the comparison, the self service fuel dispensing transaction is approved, the fuel dispenser is activated to dispense fuel, the amount and cost of fuel dispensed is totalized, the transaction is recorded at the end of the dispensing operation for future billing, and a receipt is printed for the customer.

DETAILED DESCRIPTION OF PREFERRED EMBODIMENT

Figures 1, 2:
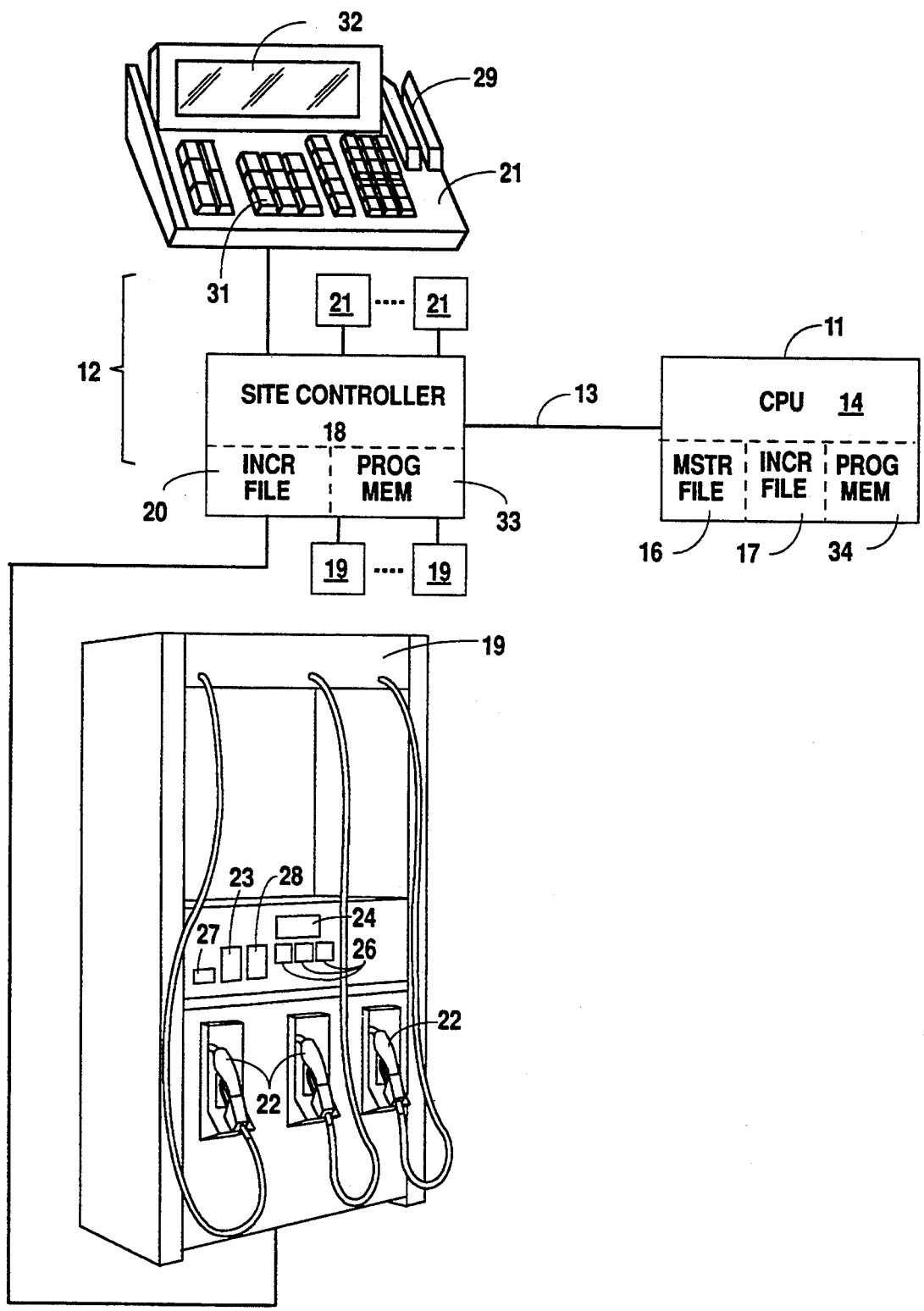
FIG. 1 is a block diagram of the financial transaction approving apparatus of the present invention.
FIG. 2 is an example of an entry in an incremental invalid transaction card file, in accordance with the present invention.

Referring to FIG. 1, presented is a block diagram of the apparatus of the present invention including centralized computer network 11 connected to vendor location 12 by communications link 13. Although only one vendor location 12 is illustrated in FIG. 1, it will be understood that any number of vendor locations 12 can and will be connected to centralized computer network 11 by communications link 13.

Communications link 13 can be any type of communications link including, for example, radio link, telephone line, or optical link such as a fiber optic link. Other types of communications channels can also be used without departing from the scope of the present invention.

Centralized computer network 11 includes central processing unit (CPU) 14 which is operatively connected to a memory including master invalid transaction card file 16, and incremental invalid transaction card file 17. The information constituting master invalid card file 16 is provided by transaction card issuers, and incremental invalid card file 17 is produced from master invalid card file 16 by CPU 14 in accordance with the present invention, using the data compression method illustrated in the flow chart of FIG. 4, and described in more detail below.

Vendor location 12 can be of virtually any configuration. For example, in the preferred embodiment, vendor location 12 is a fuel and convenience store operation including site controller 18 connected to individual fuel dispensing transaction terminals 19 and point of sale transaction terminals 21. Site controller 18 can be, for example, a Site Controller available from the Wayne Division of Dresser Industries, which is a microprocessor based controller including memory and communications. In accordance with the present invention, incremental invalid transaction card file 20, which is identical in content to incremental invalid transaction card file 17 stored in CPU 14, can be periodically downloaded from centralized processor 11 over communications link 13, and stored in site controller 18. Alternatively, only the changes to incremental invalid card file 17 can be periodically downloaded to update incremental invalid card file 20.

Also in the preferred embodiment, fuel dispensing transaction terminals 19 can be, for example, Vista brand fuel dispensers available from the Wayne Division of Dresser Industries, each of which includes a plurality of fuel dispensing nozzles 22 (for example, for dispensing three different types of gasoline), and a transaction card reader 23. Using the preferred site controller, up to 24 Vista brand fuel dispensers can be connected to site controller 18, however, it should be noted that any number of fuel dispensing transaction terminals 19 can be connected to site controller 18 without departing from the scope of the invention.

Fuel dispensing transaction terminals 19 also include totalizing display 24 which displays both the totalized cost and totalized amount of fuel dispensed, and individual price displays 26 which display the price per unit volume of the fuel being dispensed by dispensing nozzles 22. In addition, fuel dispensing transaction terminals 19 include cash handling portion 27 which accepts scrip for self service cash gasoline purchases, and printer 28 for printing customer receipts at the end of a transaction.

Also in the preferred embodiment, point of sale transaction terminals 21 can be point of sale workstations, such as, for example, Wayne Plus brand Retail Control Systems, available from the Wayne Division of Dresser Industries, which are point of sale terminals including a transaction card reader 29, keyboard 31 and display 32. Using the preferred site controller, up to two Wayne Plus brand terminals can be connected to site controller 18, however, any number of point of sale transaction terminals 21 can be connected to site controller 18 without departing from the scope of the invention.

In self service fueling operation, in accordance with the present invention, a self service fuel customer inserts a transaction card into card reader 23 of fuel dispensing transaction terminal 19. The transaction card account number is then processed within site controller 18 in accordance with the validating procedure shown in the flow chart of FIG. 3, described in more detail below. If the transaction card account is determined to be invalid, the transaction is disapproved. If, on the other hand, the transaction card account is determined to be valid, fuel dispensing transaction terminal 19 is activated, and the totalized amounts displayed in totalizing display 24 are reset, enabling the customer to dispense the desired fuel from one of dispensing nozzles 22. When dispensing is completed, the customer returns the nozzle to the fuel dispensing transaction terminal 19, a record is made of the transaction card account and the amount of the purchase in order to allow future billing, and a customer receipt is printed by receipt printer 28, thus completing the transaction.

Other examples of fuel dispensing systems which could be modified, as presented herein, to practice the presently claimed invention, include those disclosed in U.S. Pat. Nos. 3,927,800; 4,067,486; and 4,290,538, the disclosures of each of which are expressly incorporated herein by reference.

In accordance with the present invention, the information on invalid transaction cards is converted from a master list of invalid accounts (stored in master invalid transaction card file 16) to an incremental file of invalid accounts (stored in incremental invalid transaction card files 17 and 20). The master list of invalid accounts is arranged in ascending numerical order. Incremental invalid transaction card files 17 and 20 are comprised of individual bytes, an example of which appears in FIG. 2. Individual bytes or groups of bytes in incremental invalid transaction card files 17 and 20 indicate the increment or difference between consecutive invalid accounts stored in master invalid transaction card file 16. Thus, rather than storing the entire account number for a particular invalid card, only the increment between an invalid account number and the immediately preceding invalid account number is stored.

A typical transaction card account includes up to 20 digits, which would require 160 bits of memory, assuming 8 bits per digit in ascii format. In contrast, in accordance with the present invention, the increment between successive accounts can be represented by as few as 8 bits, resulting in a reduction in memory requirements by roughly a factor of 20, without any loss of information.

Referring to FIG. 2, shown is an example of a single 8-bit entry in incremental invalid transaction card files 17 and 20. Although an 8-bit byte is used to illustrate the invention, it will be understood that bytes of any length can be used without departing from the scope of the present invention, as long as individual entries in incremental invalid transaction card file 17 and 20 represent account increments rather than account numbers. The six least significant bits of the 8-bit byte, $B_{0-5}$, represent the value (VAL) of the increment, and the two most significant bits, $B_6$ and $B_7$, include control information, which is used, as described in more detail below, to modify the increment value represented by the VAL bits.

Specifically, the add/increment (A/I) bit $B_7$ determines whether the value represented by the VAL bits $B_{0-5}$ should be added to the previous account number, and the sum compared against the account number under consideration, or whether the value represented by the VAL bits should simply be added to the previous account number, with the compare operation deferred until subsequent bytes are processed. In addition, if successive bytes within the incremental invalid transaction card file have A/I bits set, the values of the VAL bits of those successive bytes are left-shifted to effectively multiply the represented value. These operations are presented in more detail with reference to the flow chart of FIG. 3.

The large/small increment (L/S) bit, $B_6$, in combination with A/I bit, $B_7$, determine the magnitude of the increment represented by VAL bits $B_{0-5}$. Specifically, if the A/I bit is not set, the value represented by the VAL bits is equal to the binary value of the VAL bits, with the L/S bit representing the most significant bit (i.e., from 0–127). If the A/I bit is set, and the L/S bit is not set (indicating a small increment), the value of the increment represented by the VAL bits is equal to the binary value of the VAL bits multiplied by 128 (i.e., from 128 to 8,064). Finally, if the A/I bit is set and the L/S bit is also set (indicating a large increment), the incremental value represented by the VAL bits is equal to the binary value of the VAL bits, multiplied by 8,065 (i.e., from 8,065 to 508,095).

Figure 3:
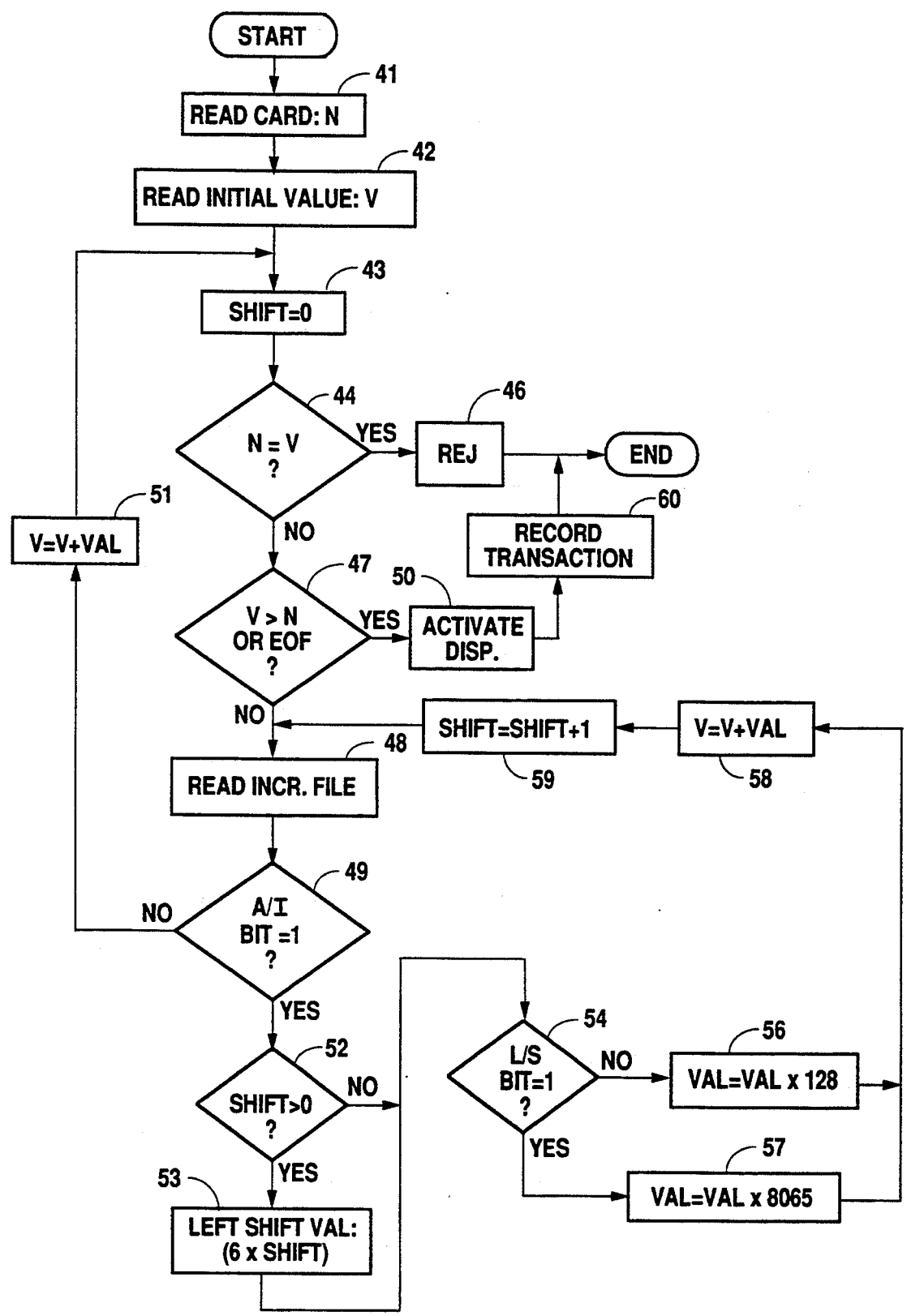
FIG. 3 is a flow chart illustrating the operation of the apparatus of FIG. 1 to assess the validity of a transaction card, in accordance with the method of the present invention.

This operation is further illustrated with reference to the flow chart of FIG. 3 which presents the method of operation of the apparatus shown in FIG. 1, in accordance with the present invention. In practice, the method illustrated in the flow chart of FIG. 3 is coded and loaded into a portion of microprocessor program memory 33 residing within site controller 18 of FIG. 1. Then, when a transaction card is read by the card readers of any of transaction terminals 19, 21, site controller 18, in addition to its other functions (unrelated to the present invention), also conducts a transaction card validity analysis in accordance with the flow chart of FIG. 3, using the information stored in incremental invalid transaction card file 20.

Referring to FIG. 3, control begins in block 41 where the reading of a transaction card (by card readers 23 or 29, FIG. 1) is awaited. After transaction card account number, N, is read, control passes to block 42 where the first value, V, for the first invalid account is resolved from the information contained within incremental invalid transaction card file 20. In the preferred embodiment, the initial value is assumed to be zero, in which case, the entire incremental file contains incremental data. Alternately, the first 160 bits (20 bytes) of incremental file 20 can be the actual value of the first invalid account number, with all subsequent data in file 20 being incremental data.

After the initial value is determined in block 42, control passes to control block 43 where the shift indicator, SHIFT, is reset. Then, in decision block 44, the transaction card account number under consideration, N, is compared with the resolved invalid account number, V, to determine if there is a match. If there is a match, control passes to block 46 where the transaction is rejected, and the process ends.

If decision block 44 determines no match, control passes to decision block 47 where it is determined whether the resolved invalid account number, V, is greater than the account number under consideration, N, or whether the end of the incremental file has been reached. If so (indicating that the transaction card account number under consideration has been passed, or that the entire incremental file has been processed without ever finding a match for the account number under consideration), the transaction is accepted, control passes to block 50 where the fuel dispenser is activated and then to block 60 where the transaction is recorded, and receipt printed. The process is then ended.

If decision block 47 determines that the account number under consideration has not been passed or that the end of the incremental file has not been reached, control passes to block 48 where the next entry in incremental file 20 is read. As mentioned above with reference to FIG. 2, each entry in incremental file 20 includes an A/I bit, an L/S bit, and VAL bits.

Control then passes to block 49 where it is determined whether the A/I is set. If not, the value, V, of the previous invalid account number is incremented by an amount equal to VAL in block 51 (the L/S bit being used as the most significant bit with the VAL bits), resulting in a new invalid account number, V. Control then returns to block 43 wherein comparison between the new invalid account number, V, and the account number under consideration, N, is conducted.

If decision block 49 determines that the A/I bit is set, control passes to decision block 52 where the value of the shift indicator, SHIFT, is tested. If SHIFT is greater than 0, indicating that the value represented by the VAL bits should be multiplied by left shifting, control passes to block 53 where the six VAL bits are shifted to the left by six bits multiplied by the SHIFT value. In other words, if SHIFT is one, the VAL bits are left-shifted by six places, if SHIFT is two, the VAL bits are left-shifted by twelve places, and so forth. Control then passes to decision block 54.

Decision block 54 tests the L/S bit. If the L/S bit is not set (indicating a small increment), control passes to block 56 where the number represented by the VAL bits is multiplied by 128. In the alternative, if decision block 54 determines that the L/S bit is set (indicating a large increment), control passes to block where the number represented by the VAL bits is multiplied by 8,065.

Control then passes to block 58 where the account number, V, is incremented by the incremental value, VAL. The shift indicator, SHIFT, is then incremented in block 59, and control passes back to block 48 where the next entry in incremental file 20 is retrieved without performing a compare operation in block 44. Processing continues in this loop until decision block 49 determines that the A/I bit is not set, indicating that an increment and a compare operation should be conducted, as described above.

The following Examples A–H illustrate how successive entries in incremental invalid transaction card file 20 are resolved into actual increments between invalid account numbers.

EXAMPLE A

| 0110 0000 | Add 96 and compare (Total increment = 96) |
|---|---|

EXAMPLE B

| 1000 0001 | Add 128, don't compare |
|---|---|
| 0100 1101 | Add 77 and compare (Total increment = 205) |

EXAMPLE C

| 1100 0001 | Add 8,065, don't compare |
|---|---|
| 0110 0000 | Add 96 and compare (Total increment = 8,161) |

EXAMPLE D

| 1100 0010 | Add 16,130, don't compare |
|---|---|
| 0101 0000 | Add 80 and compare (Total increment = 16,210) |

EXAMPLE E

| 1110 1001 | Add 330,665, don't compare |
|---|---|
| 0100 1101 | Add 77 and compare (Total increment = 330,742) |

EXAMPLE F

| 1111 1111 | Add 508,095, don't compare |
|---|---|
| 0000 0000 | Add 0 and compare (Total increment = 508,095) |

EXAMPLE G

| 1111 1111 | Add 508,095, don't compare |
|---|---|
| 1111 1111 | Add (4,032 × 8,065), don't compare |
| 0000 0010 | Add 2 and compare (Total increment = 33,026,177) |

EXAMPLE H

| 1100 0010 | Add 16,130, don't compare |
|---|---|
| 1111 1111 | Add (4,032 × 8,065), don't compare |
| 0000 0100 | Add 4 and compare (Total increment = 32,534,214) |

Figure 4:
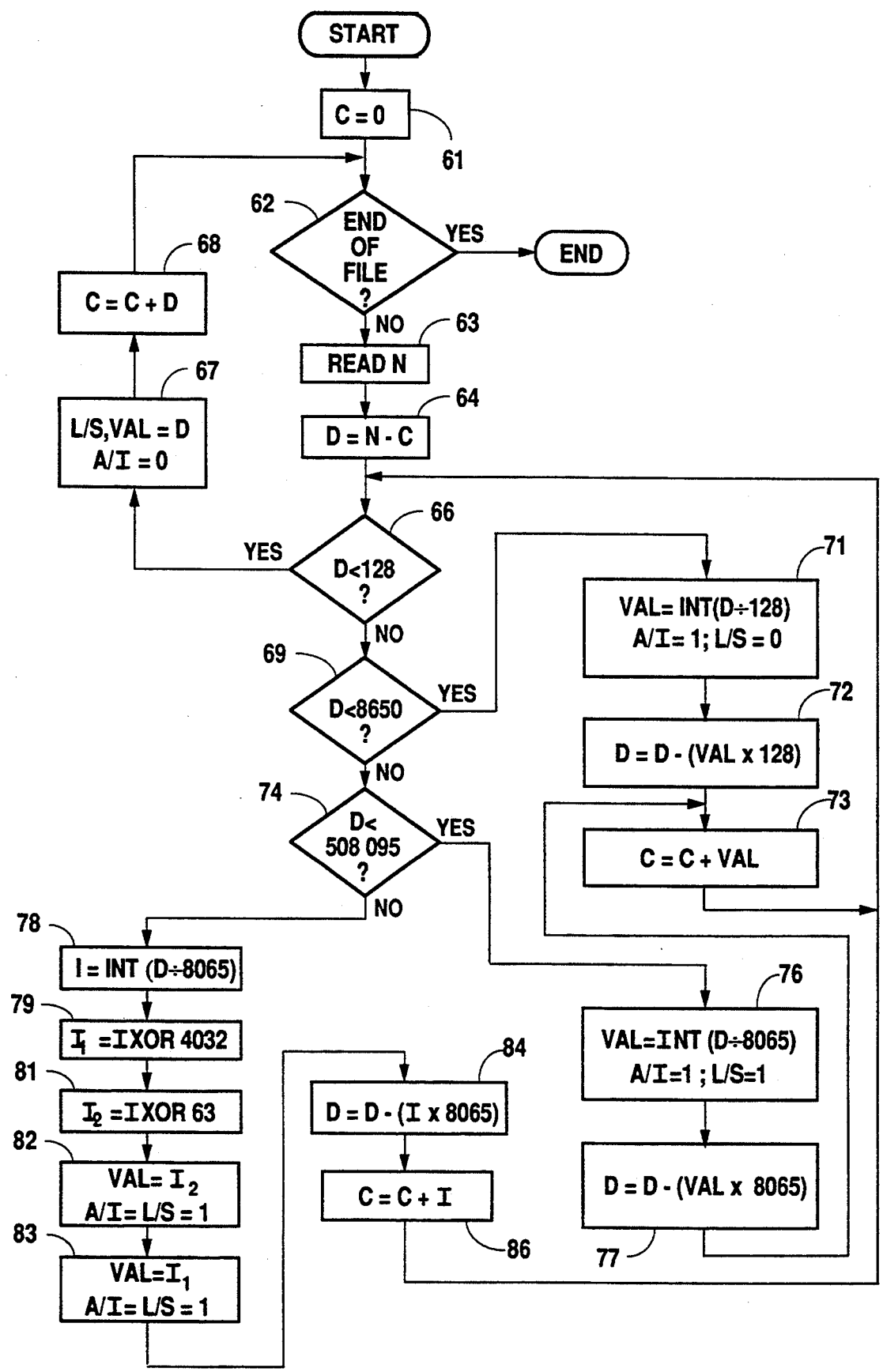
FIG. 4 is a flow chart illustrating the operation of the apparatus of FIG. 1 to compress a master list of invalid transaction cards in accordance with the method of the present invention.

Turning now to FIG. 4, the method of constructing incremental invalid transaction card file 17 from master invalid transaction card file 16, in accordance with the present invention, is presented. Before data compression can begin, the account numbers in master invalid transaction card file 16 are ordered in ascending numerical order.

In practice, the flow chart of FIG. 4 is coded and loaded into a portion of program memory 34 associated with CPU 14. Then, in addition to other operations (unrelated to the present invention) CPU 14 will compress the information in master invalid transaction card file 16 to create a new incremental transaction card file 17, whenever master file 16 is updated. Then, incremental file 17 is downloaded to each vendor location 12 to be stored as incremental transaction card file 20. Such downloading can be done at convenient times, for example in the middle of the night.

Referring to FIG. 4, control begins in block 61 where current value, C, is set to 0. Control then passes to decision block 62 where it is determined whether the end of master invalid transaction card file 16 has been reached. If so, indicating completion of the creation of a new incremental transaction card file 17, the compression routine is ended. If not, control passes to block 63 where the next transaction card account number, N, in master invalid transaction card file 16 is read. Control then passes to block 64 where the difference, D, between the new account number, N, and the current value, C, is calculated. It should be noted that if the first bytes in incremental invalid card file 17 are to represent an actual invalid account number, the actual value, N, of the first account number read from master invalid transaction card file 16 will be loaded into incremental transaction card file 17, and difference, D, will be calculated for all subsequent account numbers in master invalid transaction card file 16.

Control then passes to decision block 66 where it is determined whether difference, D, is less than 128. If so, control passes to block 67 where the L/S and VAL bits of the next entry in incremental transaction card file 17 are set according to difference, D, and the A/I bit of that entry is set equal to 0. Control then passes to block 68 where current value, C, is incremented by the difference, D, and control returns to decision block 62.

If decision block 66 determines that the difference, D, is not less than 128, control passes to decision block 69 where it is determined whether difference, D, is less than 8065. If so, indicating that the next entry in incremental transaction card file 17 should be a small increment, control passes to block 71 where the VAL bits of the next entry in file 17 are set equal to the integer portion of difference, D, divided by 128 (the remainder being ignored), and where the A/I bit is set equal to 1, and the L/S bit is set equal to 0. Control then passes to block 72 where difference, D, is recalculated as the old difference, D, less VAL (calculated in block 71) multiplied by 128. This recalculation resets D to the remainder that was ignored in block 71. Control then passes to block 73 where current value, C, is incremented by VAL. Control then returns to decision block 66.

If decision block 69 determines that difference, D, is not less than 8065, control passes to decision block 74 where it is determined whether difference, D, is less than 508,095. If so, indicating that the next entry in incremental transaction card file 17 should be a large increment, control passes to block 76 where the VAL bits of the next entry in file 17 are set equal to the integer portion of difference, D, divided by 8065 (the remainder being ignored), and the A/I bit and L/S bit are each set equal to 1. Control then passes to block 77 where difference, D, is decremented by an amount equal to VAL (calculated in block 76) multiplied by 8065. This sets D equal to the remainder that was ignored in block 76. Control then passes to block 73 where current value, C, is incremented by VAL (calculated in block 76), and control returns to decision block 66.

If decision block 74 determines that difference, D, is not less than 508,095, indicating that a shift operation is necessary, control passes to block 78 where value, I, is set equal to the integer portion of difference, D, divided by 8065. Control then passes to block 79 where value, $I_1$, is set equal to the Exclusive-Or of the value, I (calculated in block 78) and the binary value of 4032 (111111 000000). Then in block 81, value, $I_2$, is calculated as the Exclusive-Or of the value, I (calculated in block 78) and the binary value 63 (000000 111111). By this method, value $I_1$ is set equal to the six most significant bits of value, I, and value, $I_2$, is set equal to the six least significant bits of value, I.

Then, in block 81, the VAL bits of the next entry in incremental transaction card file 17 are set equal to value $I_2$, with the A/I and L/S bits of that entry being set equal to 1. Then, in block 83, the VAL bits of the next entry in incremental transaction card file 17, are set equal to the value, $I_1$, with the A/I and L/S bits of that entry being set to 1. By this procedure, when these two consecutive entries are encountered when incremental transaction card file 17 is being processed according to the decompression flow chart of FIG. 3, two consecutive A/I bits being set will indicate that the VAL bits of the second entry should be left shifted six bits.

Control then passes to block 84 where difference, D, is decremented by value, I (calculated in block 78) multiplied by 8065. Then, in block 86, current value, C, is incremented by value, I, and control returns to decision block 66.

Although the invention has been described with respect to a preferred embodiment it will be understood by those of skill in this art that additions, deletions and changes can be made to this preferred embodiment, without departing from the spirit and scope of the present invention. For example, the present invention has been described with reference to invalid transaction card files (so-called negative files). However, the present invention can also use valid transaction card files (so-called positive files). Then, if decision block 44 (FIG. 3) determines a match, block 46 accepts, rather than rejects, the transaction. Approving a valid transaction card is thus the equivalent of disapproving an invalid card for the purposes of this invention.

What is claimed is:

1. A fuel dispensing apparatus having transaction card approval capabilities, comprising:
   at least one controllable fuel dispenser, each having a card reader associated therewith for reading transaction card account numbers;
   a memory for storing incremental invalid transaction card account data; and
   a data processor, for resolving actual invalid transaction card account data from said incremental invalid transaction card account data, and for producing an indication of fuel dispensing approval in accordance with a comparison between said actual invalid transaction card account data and transaction card account numbers read by said card reader;
   said at least one controllable fuel dispenser being activated responsive to said indication of fuel dispensing approval.

2. The apparatus of claim 1 further comprising:
   a transaction recorder for recording a totalized amount and cost of fuel dispensed.

3. The apparatus of claim 2 further comprising:
   at least one point of sale terminal having a card reader associated therewith for reading transaction card account numbers, said data processor also operable to provide an indication of transaction approval in accordance with a comparison between said actual invalid transaction card account data and transaction card account numbers read by said card reader associated with said point of sale terminal.

4. A method of dispensing fuel, comprising:
   storing incremental approval or disapproval transaction card account data;
   determining an account number of a transaction card presented for a fuel purchase;
   resolving said incremental approval or disapproval transaction card account data into actual approval or disapproval transaction card account data;
   comparing said account number of said transaction card presented for a fuel purchase with said actual approval or disapproval transaction card account data;
   producing an indication of dispensing approval in response to a favorable comparison; and
   dispensing fuel responsive to an indication of dispensing approval.

5. The method of claim 4, further comprising:
   recording totalized cost and amount of fuel dispensed after said dispensing step.

* * * * *